G. V. SHEFFIELD.
Assignor, by mesne assignments, to R. A. Cook.
Heel-Stiffeners for Boots and Shoes.
No. 8,477. Reissued Nov. 5, 1878.
Fig. I.
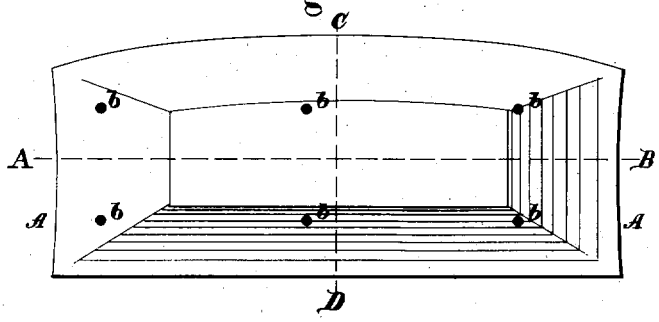
Fig. 2.
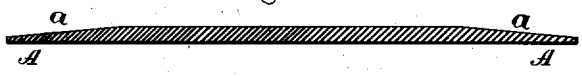
Fig. 3.
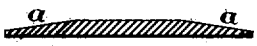
WITNESSES
Joseph A Miller Jr
William L. Roff
INVENTOR
George V Sheffield
by Joseph A Miller
Attorney

UNITED STATES PATENT OFFICE.

GEORGE V. SHEFFILED, OF NORTHBRIDGE, MASSACHUSETTS, ASSIGNOR, BY MESNE ASSIGNMENTS, TO RUTH A. COOK.

IMPROVEMENT IN HEEL-STIFFENERS FOR BOOTS AND SHOES.

Specification forming part of Letters Patent No. 102,720, dated May 3, 1870; Reissue No. 8,177, dated November 5, 1878; application filed May 4, 1878.

*To all whom it may concern:*

Be it known that I, GEORGE V. SHEFFIELD, of Northbridge, in the county of Worcester and State of Massachusetts, have invented certain new and useful Improvements in Counters for Boots and Shoes; and I do hereby declare that the following is a full, clear, and exact description of the same, reference being had to the accompanying drawings, forming part of this specification.

Figure 1 represents my improved counter in side view. Fig. 2 is a longitudinal section of the same on line A B. Fig. 3 represents a transverse section on line C D.

To enable those skilled in the art to which my invention belongs to make and use the same, I will proceed to describe the same more in detail.

The nature of my invention consists in an improved counter for boots and shoes, and in the peculiar manner hereinafter explained for making the same.

Heretofore counters for boots and shoes have been made of several pieces of leather pasted together, or of leather, leather-board, or pasteboard, of the proper thickness. These were cut to the proper shape, and the edges scarfed so as to form a thin edge. The process requires much time and labor and also considerable skill to fit them properly, and even then they cannot be made with any great degree of uniformity.

In the drawings, Figure 1 represents one of my improved counters of the form required for a boot, the ends A A being formed nearly square, so as to be stitched into the siding.

For shoes the counters would be of a somewhat different form, but would be made in the same manner, which is as follows: A concave die is cut in the required form of the counter, the edges of which are to be beveled off, as indicated at *a a*. This die is provided with projecting pins, which enter the stock or material of the counter at the points indicated at *b*, to hold it in place within the die during the process of manufacture.

The material of which the counter is to be made is cut into suitable pieces and placed upon the concave die, which is then passed under a hammer or other suitable pressing device by means of a movable carriage, and the material is thus forced firmly into the die, after which the die with the formed counter is passed under a cutter or a planing-knife, which removes all superfluous stock from the counter, leaving it in proper condition for use, making a counter of the proper thickness, and also giving the proper bevel or scarfing around the edges *a a*. A counter thus made is superior to counters made in the ordinary manner, inasmuch as the fibers of the stock are forced firmly together, while at the same time the beveled surface is made very smooth and even.

Counters can be made by my invention of thick upper-leather, which will be equal, or nearly so, to those heretofore made of the best sole-leather, and with suitable dies any desired shape can be given to the counter by compressing the material, and thus a better and cheaper counter or stiffener produced than has heretofore been possible. The cost is reduced and great uniformity secured, while the compression increases the stiffness and durability of the counter.

Having thus described my invention, I claim as new and desire to secure by Letters Patent—

1. As an improved article of manufacture, a heel-stiffener one surface of which is formed with compressed beveled edges and the opposite surface made plain by cutters, substantially as set forth.

2. The method of forming heel stiffeners consisting in subjecting the blank to compression, and forming compressed beveled edges, and removing surplus material on the opposite side of the blank by knives or cutters while the counter or stiffener is retained in the die, substantially as set forth.

GEORGE V. SHEFFIELD.

Witnesses:

ANDREW COMSTOCK,
SIMON S. COOK.